April 1, 1930. H. SMITH 1,752,511
CONVERTIBLE BODY
Filed July 14, 1927 3 Sheets-Sheet 1
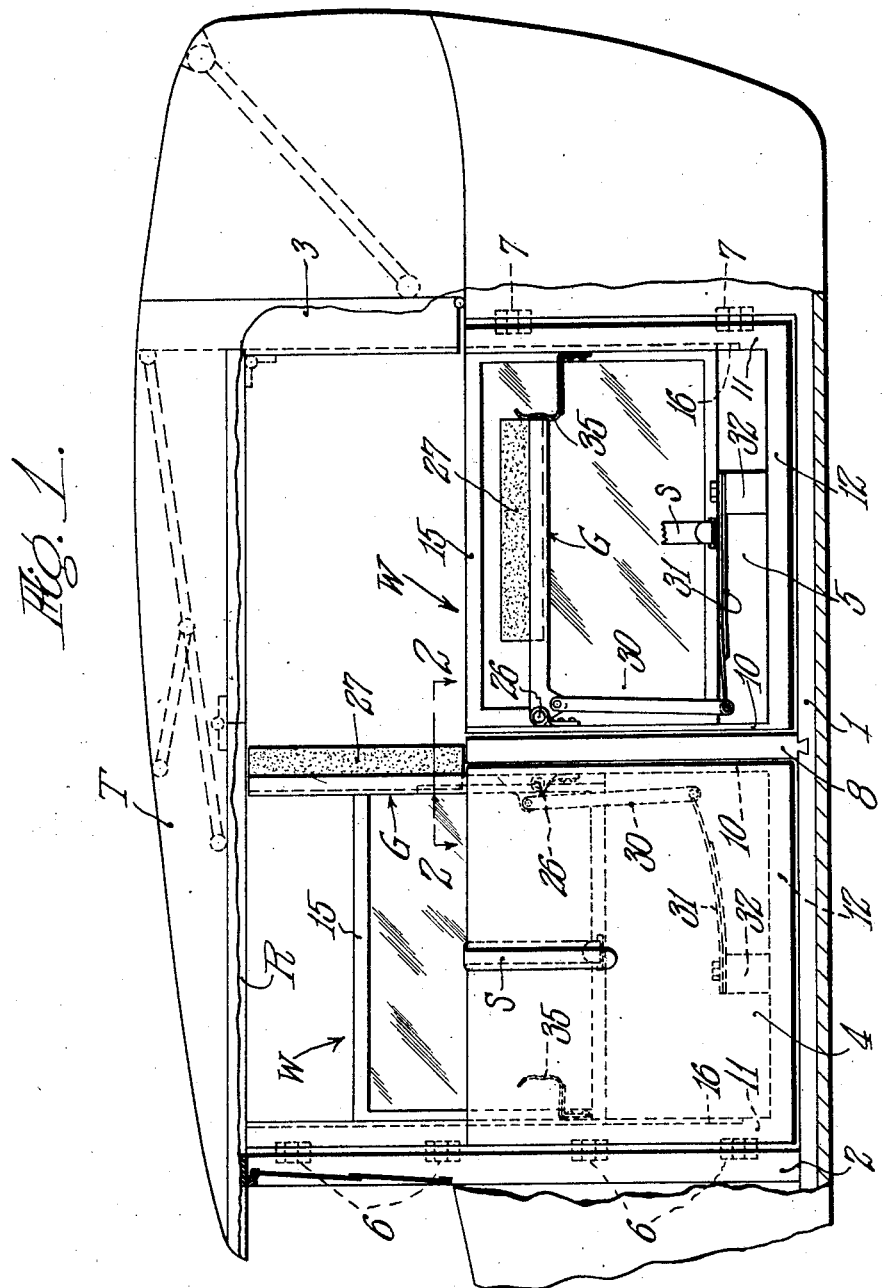
INVENTOR.
Hinsdale Smith
BY Chapin & Neal
ATTORNEYS.

April 1, 1930.  H. SMITH  1,752,511
CONVERTIBLE BODY
Filed July 14, 1927  3 Sheets-Sheet 2
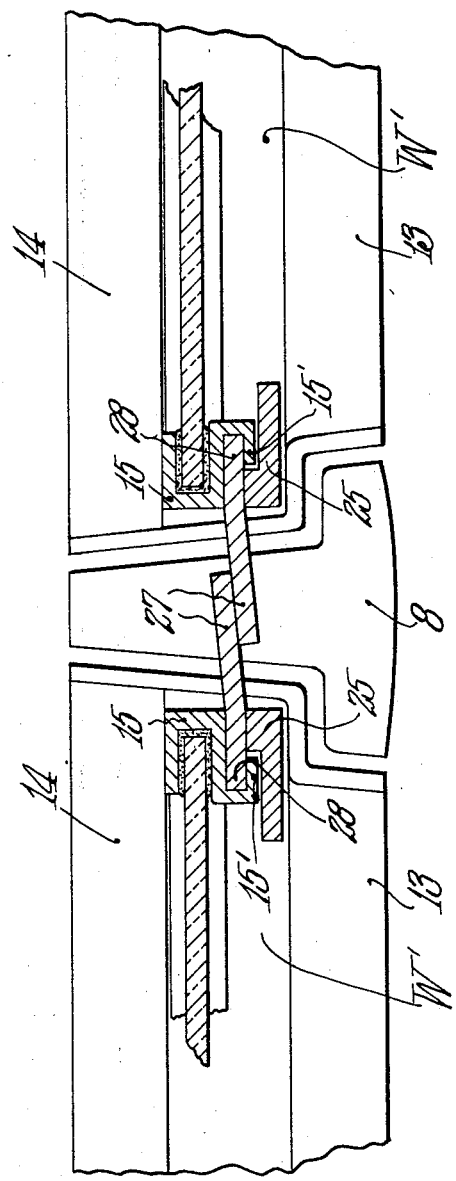
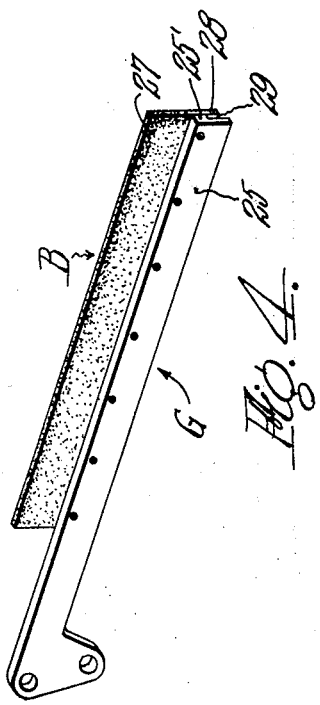
INVENTOR.
Hinsdale Smith
BY Chapin & Neal
ATTORNEYS.

April 1, 1930.  H. SMITH  1,752,511
CONVERTIBLE BODY
Filed July 14, 1927  3 Sheets-Sheet 3
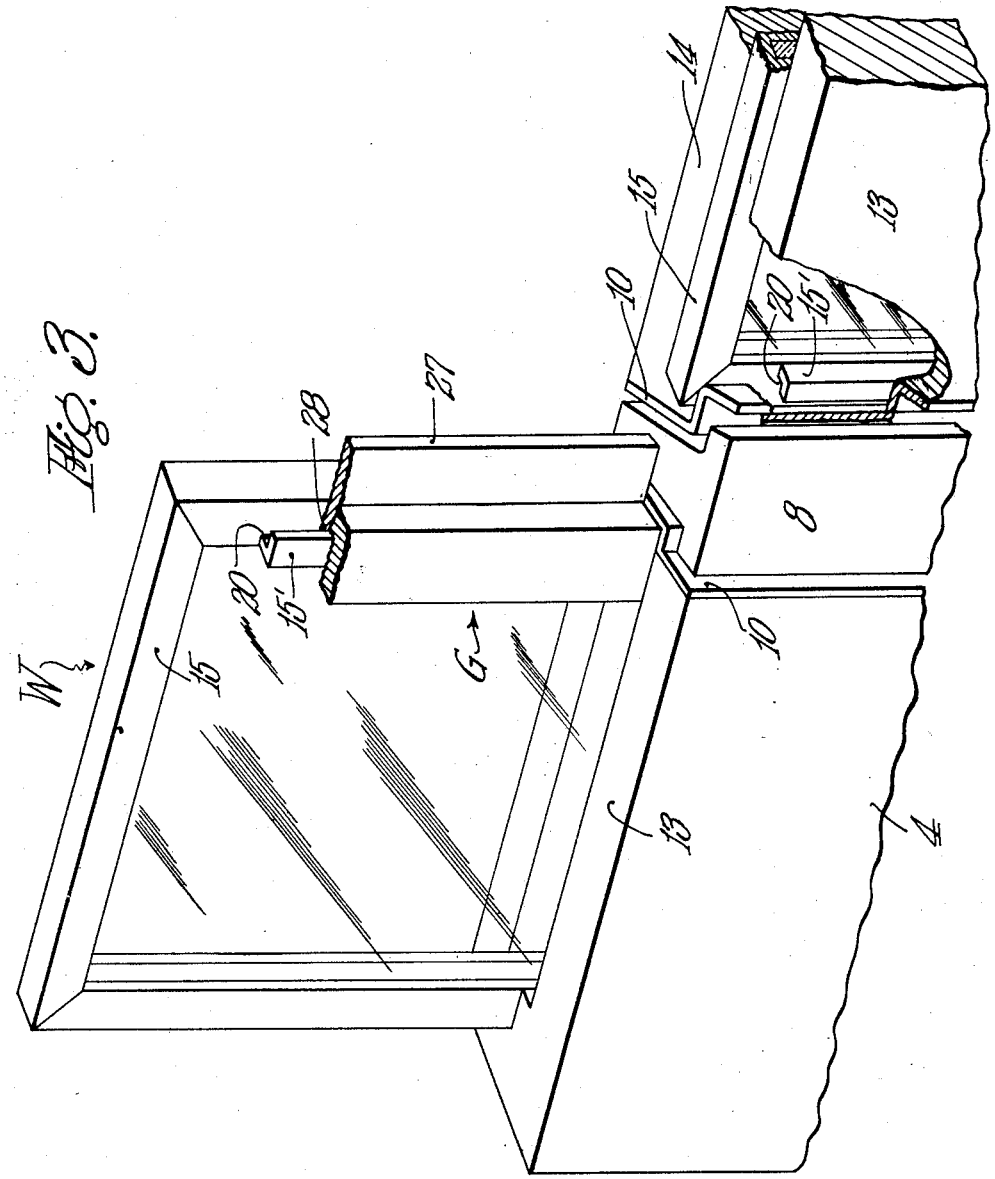
INVENTOR.
Hinsdale Smith
BY Chapin & Neal
ATTORNEYS.

Patented Apr. 1, 1930

1,752,511

UNITED STATES PATENT OFFICE

HINSDALE SMITH, OF SPRINGFIELD, MASSACHUSETTS, ASSIGNOR TO INGLIS M. UPERCU, OF NEW YORK, N. Y.

CONVERTIBLE BODY

Application filed July 14, 1927. Serial No. 205,723.

This invention relates to improvements in convertible bodies for vehicles such as automobile bodies and more particularly to improvements in the windows and guides therefor.

There is an increasing demand for bodies which may be converted or transformed from a closed body such as a sedan or coupé into a body of the open type such as a touring car or roadster, but convertible bodies of the prior art are not satisfactory for many objectionable reasons which will be briefly pointed out. These bodies of the prior art, which usually have a top that is foldable or collapsible so as to be removable from its position over the body, have movable or attachable windows, miscellaneous posts, jambs or the like which necessitate numerous connections which wear readily and cause rattling or rumbling of the parts. The construction as a whole is not adapted for rigidity, the parts are inclined to weave back and forth more or less so that there is not a proper swinging action of the doors and windows.

One particular objection to convertible bodies of the prior art is that the ordinary movable window guide, called a "flapper," carried by the door is subjected to excessive strains and wear so that it is not rigid when in guiding position and as a consequence the window is not properly held or guided. Also, as the "flapper" and its connections become worn, it does not function properly with a cooperating post or jamb adjacent thereto to the end that difficulty is experienced in opening or closing the door. To overcome this objection, according to one novel feature of my invention, I provide a window guide of rigid construction which is hinged to the door and adapted to swing relative thereto between non-guiding position within a slot of the door and a guiding position at the upper side thereof.

According to another novel feature of the invention, I provide means for propelling the window guide from within the door to a window guiding position which is controlled in its operation by the position of the window.

According to a further novel feature of the invention, I provide a yieldable and flexible bearing strip associated with the guide which is adapted to cooperate with a similar strip of an adjacent guide, post or the like, and is arranged so as to provide a tight joint therebetween and at the same time not only allow a free swinging movement of a window but also eliminate any tendency of the parts to rattle and rumble. Also the strip provides a structure wherein a rigid post or jamb at a side of a swinging window may be entirely eliminated so that the window may tilt sideways when moved out of alignment by a movement of the parts.

According to a further novel feature of the invention, I provide means for yieldingly embracing or engaging the guide when in non-guiding position within the door to thereby hold it in position against movements which would tend to cause rattles.

According to a still further feature of the invention, I provide a pivoted guide which has its pivotal connections so disposed that when the guide is in guiding position it has a substantial bearing on the door to the end that it is rigidly supported so as to act as a rigid supporting guide for the window.

The invention is adapted for broad application, but for the purposes of disclosure will be described in connection with the accompanying drawings which show a modification of the invention at present preferred.

In the drawings:

Fig. 1 is a longitudinal view partly in section of a convertible body such as an automobile body taken so as to show the inside faces of the doors at the far side of the body with the inner door panels removed for clearness and with a window of one of the doors in a partially raised position;

Fig. 2 is an enlarged plan view taken on the line 2—2 of Fig. 1 with both of the windows shown in a raised position to illustrate certain features of the invention;

Fig. 3 is a perspective view showing the upper edges of the doors and one of the windows and guides therefor in raised position; and Fig. 4 is a perspective view of one of the window guides.

Referring to the drawings in detail, especially Fig. 1 which is a view taken inside of a body and looking outwardly therefrom, a sill member is shown at 1 which extends longitudinally thereof and has at its forward end a corner post 2 of well known and usual construction which supports the forward end of a top T. The top T shown is of the collapsible type having the usual rail R and rear post 3 hinged to the body in the manner shown, all being arranged and adapted so that the top may be collapsed or folded up at the rear end of the body in the usual and well known manner.

Doors 4 and 5 mounted by hinges 6 and 7 (shown in dotted lines) to the body are adapted to swing outwardly from the position shown in Fig. 1. Their adjacent inner edges or sides (as shown in Fig. 2) lie at opposite sides of an upright post 8 which may be secured in any convenient manner to the rail or sill 1. The post may be of any shape or material and serves as a common post for the doors 4 and 5, and the edges of the doors may be made so as to conform therewith. Door locking devices (not shown) may be carried by the doors and post for locking the doors in closed position as is usual.

Each of the doors preferably comprises a U-shaped frame having side members 10 and 11 connected or secured to a lower sill member 12. To these frame members are secured inner and outer panels 13 and 14, the latter of which may be sheathed with metal or the like as is usual, while the former may be upholstered in the usual and well known manner.

It will be readily appreciated that the door frames and panels may be made of metal or of any other material desired, the form shown being intended merely to illustrate a frame and spaced apart inner and outer panels to provide a window slot W' therebetween for receiving a window W and the mechanism to be described and forming a part of the invention.

Windows W each comprising a sash 15 of special construction, which will later be described, embrace a light of glass at the edges thereof and are slidable in the slots W' between the panels of the door. One side of each window sash is slidable in guideways or grooves 16 in the door frame members 11 while their other sides are in sliding contact with the member 10. As the window emerges from out of the slot, it is guided in movable guides later to be described. Any means desired may be employed for moving the windows up and down in their slots of the doors and may consist of the usual crank operated mechanism, or pull straps such as S shown, it being understood that the windows are adapted and arranged for an up and down sliding movement from their slots in the doors to a position thereabove.

The sash 15, previously referred to, is preferably channel shaped in cross section for embracing the window lights and has tongues 15' at a side thereof which are spaced from the main body portion thereof so as to form a slot 20 between the tongue and sash, which tongue and slot cooperate with window guides G, now to be decribed, for a relative sliding movement.

The window guides which may be in the form of folding posts (as shown in Fig. 4) comprise a plate 25 which is suitably pivoted at one end as at 26 to the member 10 of the door frame or to the inner panel 13 of a door so as to be adapted to swing between a position within the slot of the door and an upright guiding position above the door. A boss 25' projecting outwardly from a side of the plate 25 has fixed thereto a strip B of yieldable or flexible material such as rubber or the like which may be called a "bearing strip". This strip, as shown, extends above and below, or on each side of, the boss to provide a tongue 28 and a bearing strip 27. The lower tongue 28 is spaced from the plate 25 so as to form therewith a slot 29 for receiving the tongue 15' of the window sash 15 while the yieldable tongue 28 of the plate works in the slot 20 of the sash. As will be noted, the tongue and slot 28 and 29 of guide 16 interfit with a tongue 15 and slot 20 of the sash so that the window and guide are held from a relative weaving action and yet allow the window to slide freely up and down in the guide. The extension 27 is provided for the purpose later to be described.

A link 30 pivotally connected at its upper end to the plate 25 also has its lower end pivotally connected to the free end of a flat spring 31 which has its other end fixed to the door frame member 12 by a bracket member 32, as shown. The guide G and link are preferably disposed at a side of the window while the spring 31 is disposed to underlie the sash 15 of the window so as to be acted upon and pressed downwardly thereby as the window approaches its lowermost position within the slot of the door. The characteristics of the spring and the proportioning of the link and other parts, together with the disposition of their pivotal connections, are preferably arranged so that as the window is raised from off the spring 31, the said spring will act on the guide G so as to propel it upwardly into its upright guiding position against the door frame member 10 and above the door, as shown in connection with the door at the left in Fig. 1. As will be noted, the pivot 26 is disposed at a substantial distance from or below the upper end of the door frame member 10 so that the guide, when in its upright guiding position and bearing against frame 10 has a comparatively long bearing on the frame to the end that the guide is rigidly supported for guiding the window.

A resilient member which may be in the form of a flat spring 35 or the like is secured to the door frame 11 or to the panel of the door and is arranged and adapted to engage the end of the guide G when in its lowered position so as to steady the guide against movements thereof relative to the door and also tends to hold the guide in its lowered non-guiding position against the action of spring 31.

In the operation of the apparatus, when it is desired to raise a window W, it may be elevated in the ordinary manner by any of the usual means previously referred to. As soon as it is moved upwardly from off the guide propelling spring 31, the said spring will immediately act on a guide G to move or swing it upwardly into an upright position in abutment with the door frame 10 in which position it may act as a rigid and firm guide for the window.

As the window is raised into the guide G, the resilient tongue 28 and groove 29 of the guide engage with the tongue and groove 15′ and 20 of the sash, so that as the window is elevated thereinto the interfitting tongues and slots not only function to guide the window in its sliding movements but tend to prevent a transverse relative movement of the window sash and guide and thereby eliminate any tendency of the parts to rattle or rumble.

The construction allows a free up and down movement of the window as may be desired, and the window may be left in any partially closed position desired.

When the window is lowered into its pocket or slot in the door and when nearing its lowermost position, its lower edge will engage and press on the spring 31 to force it downwardly and propel the guide G to its non-guiding position where it is engaged by the spring 35. The parts may be arranged so that when the window is in lowered position any tendency of the spring 31 to force the window upwardly will be overcome by the spring 35 which also will tend to prevent a relative movement of the door and guide G.

With the guides G of adjacent doors in their upper guiding positions, whether the windows are in full or any partially raised positions, the extensions 27 of the flexible bearing strips B of the guides will abut or lie against one another, as shown in Fig. 2, and being yieldable or flexible will allow one door to be opened or closed relative to the other. For instance, the door at the left in Fig. 2 may be opened or closed at will as when closing the flexible strip 27 of its guide will abut and bear against the outer face of the flexible strip of the guide of the door at the right. While, if the door at the right is opened, the strips will yield sufficiently to allow one to pass by the other; and when the door is closed again, its strip will abut the outer side of the other similar to the manner shown. The abutting strips provide a weather excluding joint, and allow relative opening and closing movements of the doors and at the same time, by reason of their yieldable characteristics, will permit such relative movements of the doors and windows as is caused by a weaving action of the body as is common when traveling on rough roads or the like.

If it is desired to employ the invention in connection with a single door, as distinguished from the pair of doors shown, the flexible bearing strip may be arranged to abut or lie against a door-post, jamb or the like, and as will be noted the flexible or yieldable member will permit the door to open and close readily and provide a tight joint with such post without any tendency of the parts to bind or rattle.

The invention may be employed in connection with vehicle bodies in general, but is particularly useful in connection with bodies having convertible tops. Not only is the guide for the window adapted to be concealed within the door, but when in guiding position is rigidly supported and adapted to provide a non-rigid abutment for an adjacent door or the like.

I am aware that many changes may be made in the form of the invention without departing from the scope thereof, and I prefer to be limited by the appended claims rather than by the foregoing description.

What I claim is:

1. The combination with a door and window slidable with respect thereto, of a guide pivoted to said door, means separate from the window for swinging said guide to a guiding position, the said guide and window provided with an interfitting flexible tongue and groove whereby the window is guided in its raising or lowering movements, and a flexible closure strip carried by the guide at a side thereof.

2. The combination with a door and window slidable with respect thereto of a guide pivoted to said door having a flexible closure strip and a yieldable tongue, the said window provided with a slot for receiving the tongue of said guide whereby the window may be guided for sliding movements relative to said door.

3. The combination with a pair of doors having a common post therebetween of windows slidable in said doors, folding posts pivoted to said doors adapted to be swung above said doors for supporting said windows, the said folding posts being provided with coacting relatively yieldable engageable portions which extend over said common post when the folding posts are disposed above said doors to form a closure above said common post the said yieldable portions of the posts being adapted to permit either of said doors to swing relative to the other.

4. The combination of a door and window slidable therein, with means for guiding said window comprising a guide pivoted in said door for swinging between a non-guiding position and a guiding position above said door, a spring between said guide and door tending to force said guide to its guiding position, said spring being disposed in the path of movement of said window and adapted and arranged to be rendered inoperative thereby.

5. The combination with a door and window slidable therein, of a guide pivoted in said door for swinging to a window guiding position thereabove, a spring having one end fixed to the door, connections between said guide and the other end of said spring, the spring tending to move said guide to a guiding position and being adapted and arranged to be engaged by said window when in lowered position whereby it is rendered inoperative thereby.

6. A vehicle comprising in combination, a door having a window receiving slot, a window in said slot, a guide pivoted on said door arranged for swinging movements between a non-guiding position in said slot and a window guiding position above said door and a spring device for positively swinging said guide to a guiding position which is operable as the window is moved upwardly of said slot.

7. A vehicle comprising in combination, a door having a window slot, a window slidable between a position in said slot and a position thereabove, a window guide movable relative to said door between a non-guiding position and a window guiding position above said door, spring mechanism associated with said door, window and guide tending to move said guide to a guiding position which is under the control of the window so as to be rendered operative to move said guide as the window is raised to a position above the slot and co-acting guides and guideways associated with said window and guide whereby the window is guided by said guide in its sliding movements.

8. A vehicle comprising in combination, a door having a window receiving slot, a window slidable in said slot, a window guide pivoted to said door for swinging movements between a non-guiding position and a window-guiding position, means associated with said window by the means of which said window may be raised and mechanism associated with said guide for positively propelling the same to window-guiding position, the latter being controlled in its operation by the position of the window.

9. A vehicle comprising in combination, a door having a window receiving slot, a window slidable in said slot, means associated with said window for elevating the same in said slot, a guide pivoted to said door for swinging between non-guiding and window-guiding positions and mechanism connected to said guide which is separate from the window for positively propelling said guide between said positions and which is controlled in its operation by the position of the window.

In testimony whereof I have affixed my signature.

HINSDALE SMITH.